Nov. 29, 1949     A. VANASKY     2,489,601

SHEET METAL FITTING

Filed Sept. 12, 1946

Inventor
Andrew Vanasky.
By W. B. Harpman
Attorney

Patented Nov. 29, 1949

2,489,601

UNITED STATES PATENT OFFICE 2,489,601

SHEET METAL FITTING

Andrew Vanasky, Youngstown, Ohio

Application September 12, 1946, Serial No. 696,387

3 Claims. (Cl. 285—205)

This invention relates to a sheet metal fitting such as employed in constructing duct work for conveying air to desired locations.

The principal object of the invention is the provision of a sheet metal fitting which may be used individually or in combination to achieve various offset constructions.

A further object of the invention is the provision of a sheet metal fitting which may be used in pairs positioned in alignment to one another or at right angles to one another to provide a right angle turn in duct work and the like.

A still further object of the invention is the provision of a sheet metal fitting which may be used in pairs in spaced relation to each other to achieve offset duct work construction, right angle turns and right angle and vertical turns in duct work.

The sheet metal fitting shown and described herein is primarily a basic unit which may be used in a cross sectionally rectangular duct work for making a connection with a floor register, making an axially extending offset construction or a right angle turn or forming bends from horizontal to a vertical plane. The basic fitting with simple modifications makes possible the rapid and economic construction of duct work about any obstructions or through limited wall arrangements as are commonly encountered in installing duct work.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
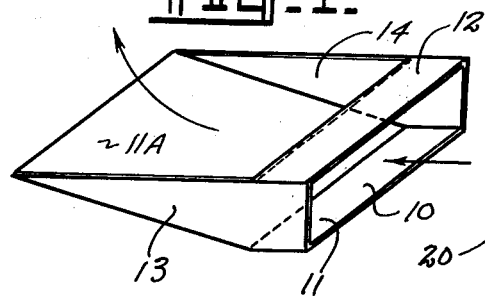
Figure 1 is a perspective view of the sheet metal fitting. Arrows indicate the direction of air flow therethrough.

By referring to the drawings and Figure 1 in particular, it will be seen that the sheet metal fitting therein disclosed comprises a short section duct work, rectangular in cross section, having an inlet opening indicated by the numeral 10 and comprising a bottom section 11 and a top section 12, and adaptable for installation on the end of a duct of conventional form and size. The side sections of the fitting are approximately triangular in shape and are indicated by the numerals 13 and 14, and an inclined continuing section of the bottom 11 is indicated by the numeral 11A. The inclined bottom section 11A forms, in conjunction with the side sections 13 and 14 and the top section 12, an approximately square horizontal opening through which air introduced into the rectangular opening 10 may be directed outwardly. It will be obvious that the air flow may be reversed from that shown by the arrows in Figure 1, as, for example, when the fitting is installed beneath a floor register or above a ceiling register.

Figure 2:
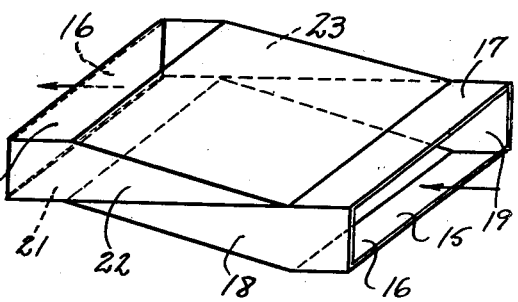
Figure 2 is a perspective view of a pair of the fittings illustrated in Figure 1 placed in opposite engaging relation. Arrows indicate the direction of air flow therethrough.

By referring to Figure 2 of the drawings, it will be seen that a pair of the sheet metal fittings, as illustrated in Figure 1 of the drawings, have been placed together in opposed relationship so that an offset fitting is provided which is capable of installation on or in a cross sectionally rectangular duct of conventional size and shape, an inlet opening being indicated by the numeral 15 and an outlet opening by the numeral 16. The construction disclosed in Figure 2 is useful in forming an air duct around an obstruction as it may be either employed for going over the obstruction or going under it. The bottom and top portions of the lower portion of the composite fitting shown in Figure 2 are indicated by the numerals 16 and 17, respectively, and the side sections by the numerals 18 and 19, respectively, and the top portion of the composite fitting shown in Figure 2 is formed of a top and bottom portion 20 and 21, respectively, and a pair of side sections 22 and 23, respectively. It will be observed that the horizontal openings defined by the two fittings are placed in registry with one another to achieve the offset construction. The fittings may be joined to one another by sheet metal screws or they may be soldered or taped together as desired.

Figure 3:
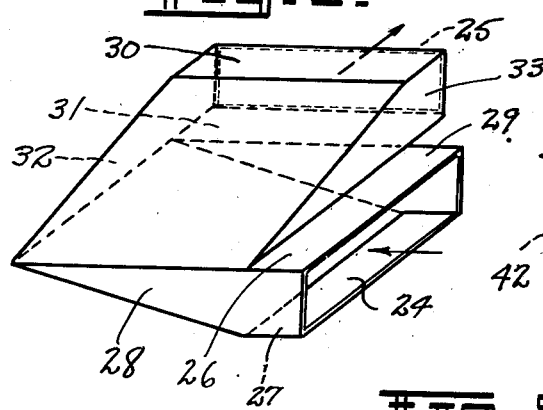
Figure 3 is a perspective view of a pair of the sheet metal fitting shown in Figure 1 placed at opposed relation and at right angles to one another to form an offset and turn construction.

In Figure 3 of the drawings a pair of the fittings, as shown in Figure 1, are employed to form an offset and right angle turn duct work construction, an inlet opening being indicated by the numeral 24 and an outlet opening by the numeral 25. The bottom fitting, which is the same as the fitting shown in Figure 1, is formed of top and bottom sections 26 and 27, respectively, and a pair of side sections 28 and 29, respectively. The uppermost fitting, which is positioned on the horizontal opening on the upper surface of the lower fitting, is similarly formed and comprises top and bottom sections 30 and 31, respectively, and side sections 32 and 33, respectively. It will be obvious to those skilled in the art that rather than forming a turn to the right, as shown in Figure 3, the top fitting may be fitted in the opposite direction so as to form a turn to the left.

Figure 4:
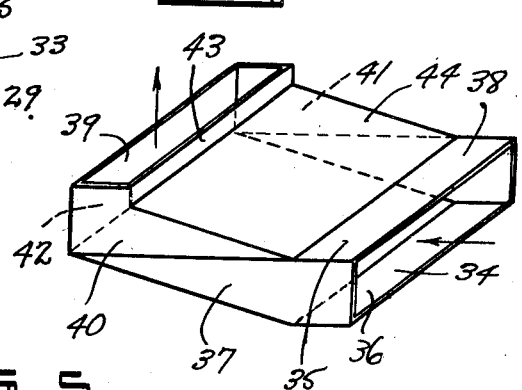
Figure 4 is a perspective view of a sheet metal fitting such as shown in Figure 1 with a modified fitting positioned thereon in opposed relation to form a turn from horizontal to vertical. Arrows indicate air flow therethrough.

In Figure 4 a construction somewhat similar to that illustrated in Figure 2 is shown with the exception that the bottom fitting, which is the same as that illustrated in Figure 1 and includes an inlet opening 34, top and bottom sections 35 and 36 and side sections 37 and 38, respectively, as a modified section positioned thereon in inverted relationship to the horizontal opening of the lower section. This modified upper section includes an outlet opening as compared with the horizontally located inlet opening, and arrows in Figure 4 indicate that air introduced into the composite fitting illustrated in Figure 4 by way of the inlet opening 34 will be directed upwardly on an angle thereby achieving the offset or unobstructed corner construction and be directed vertically out of the outlet opening 39. The modified form of the fitting employed for the upper half of the composite fitting illustrated in Figure 4 includes side panels 40 and 41 and secondary side sections 42 and 43. A horizontal opening is defined by the basis of the side sections 40 and 41 and the longer secondary side section 42. An inclined top portion of the uppermost fitting is indicated by the numeral 44.

It will be obvious to those skilled in the art that the fitting illustrated in Figure 4 is particularly advantageous in forming a connection in the duct work between a vertical stack and a horizontal run.

Figure 5:
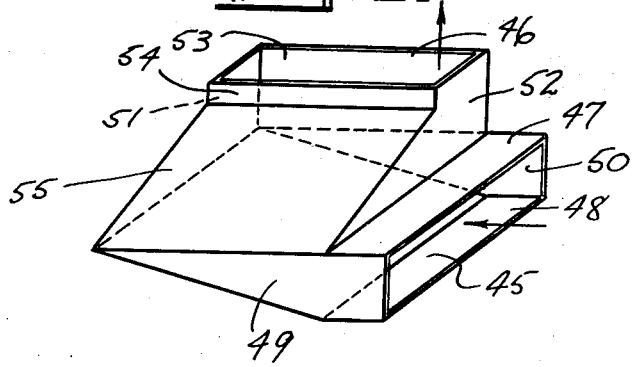
Figure 5 is a perspective view of a sheet metal fitting as shown in Figure 1 with a modified fitting in opposed relation thereon, as shown in Figure 4, the modified fitting being turned one-quarter turn to achieve a turn from horizontal to vertical and locate the outlet at right angles to the inlet. Arrows in Figure 5 indicate air flow therethrough.

In Figure 5 of the drawings a composite fitting is illustrated which is similar to the fitting illustrated in Figure 4 with the exception that the uppermost portion is turned a one-quarter turn with respect thereto so as to enable the connecting vertical and horizontal ducts to be positioned at right angles to one another rather than on the same general plane as in the case of the fitting shown in Figure 4 of the drawings. In Figure 5, the inlet is indicated by the numeral 45 and the outlet opening by the numeral 46. The bottom fitting includes top and bottom portions 47 and 48, respectively, and side sections 49 and 50, respectively. The upper portion of the composite fitting is formed of side sections 51 and 52, respectively, and secondary side sections 53 and 54, respectively. The inclined top portion of the uppermost fitting is indicated by the numeral 55.

It will thus be seen that a sheet metal fitting has been disclosed which may be used singly in several applications commonly encountered in making and installing air conveying duct work, and that when used in pairs in opposite and connected relationship, the fitting forms a composite article which is capable of advantageous use in the formation of duct work for air conveying purposes, particularly about various obstructions and interconnecting vertical and horizontal sections of duct work to one another. By modifying the outlet portion of one of the fittings employed in the composite article, the direction of air flow may be changed easily from a horizontal plane to a vertical plane, particularly as illustrated in Figures 4 and 5 of the drawings.

It will thus be seen that a simple and efficient and inexpensively formed sheet metal fitting has been disclosed which is of particular value in the formation of hot and cold air conveying duct work and the like.

Having thus described my invention, what I claim is:

1. A sheet metal fitting comprising a hollow member one end of which is of rectangular cross section and defines an inlet opening, the bottom of the said sheet metal fitting extending upwardly and outwardly from the said cross sectionally rectangular end portion and terminating on the same plane as the uppermost portion of the said cross sectionally rectangular end portion of the fitting, the side sections of the fitting having triangular extensions thereon joined at their lower edges with the upwardly and outwardly extending bottom portion and an outlet opening formed in the upper face of the said fitting.

2. A sheet metal fitting comprising a hollow member one end of which is of rectangular cross section and defines an inlet opening, the bottom of the said sheet metal fitting extending upwardly and outwardly from the said cross sectionally rectangular end portion and terminating on the same plane as the uppermost portion of the said cross sectionally rectangular end portion of the fitting, the side sections of the fitting having triangular extensions thereon joined at their lower edges with the upwardly and outwardly extending bottom portion and an outlet opening formed in the upper face of the said fitting, the said outlet opening being square and overlying the entire inclined portion of the bottom part of the said fitting.

3. Means for forming offset duct work constructions and including a pair of sheet metal fittings assembled in oppositely disposed relation to one another, each of which sheet metal fittings comprise a hollow member one end of which is of rectangular cross section and defines an opening, the bottom of the said sheet metal fitting extending upwardly and outwardly from the said cross sectionally rectangular end portion and terminating on the same plane as the uppermost portion of the said cross sectionally rectangular end portion of the fitting, the side sections of the fitting having triangular extensions thereon joined at their lower edges with the upwardly and outwardly extending bottom portion and an opening formed in the upper face of the said fitting, the last mentioned opening registering with the comparable opening in the said oppositely disposed fitting to form the said offset duct work.

ANDREW VANASKY.

REFERENCES CITED

The following references are of record in the file of this patent:

UNITED STATES PATENTS

| Number    | Name     | Date          |
|-----------|----------|---------------|
| 1,159,422 | Scannell | Nov. 9, 1915  |
| 1,457,126 | Scherer  | May 29, 1923  |
| 1,737,633 | Beach    | Dec. 3, 1929  |
| 1,808,450 | Burgess  | June 2, 1931  |
| 1,830,857 | Schmidt  | Nov. 10, 1931 |